Jan. 13, 1931.  J. S. CHILTON  1,788,984
FERTILIZER DISTRIBUTOR
Filed March 26, 1928  3 Sheets-Sheet 1
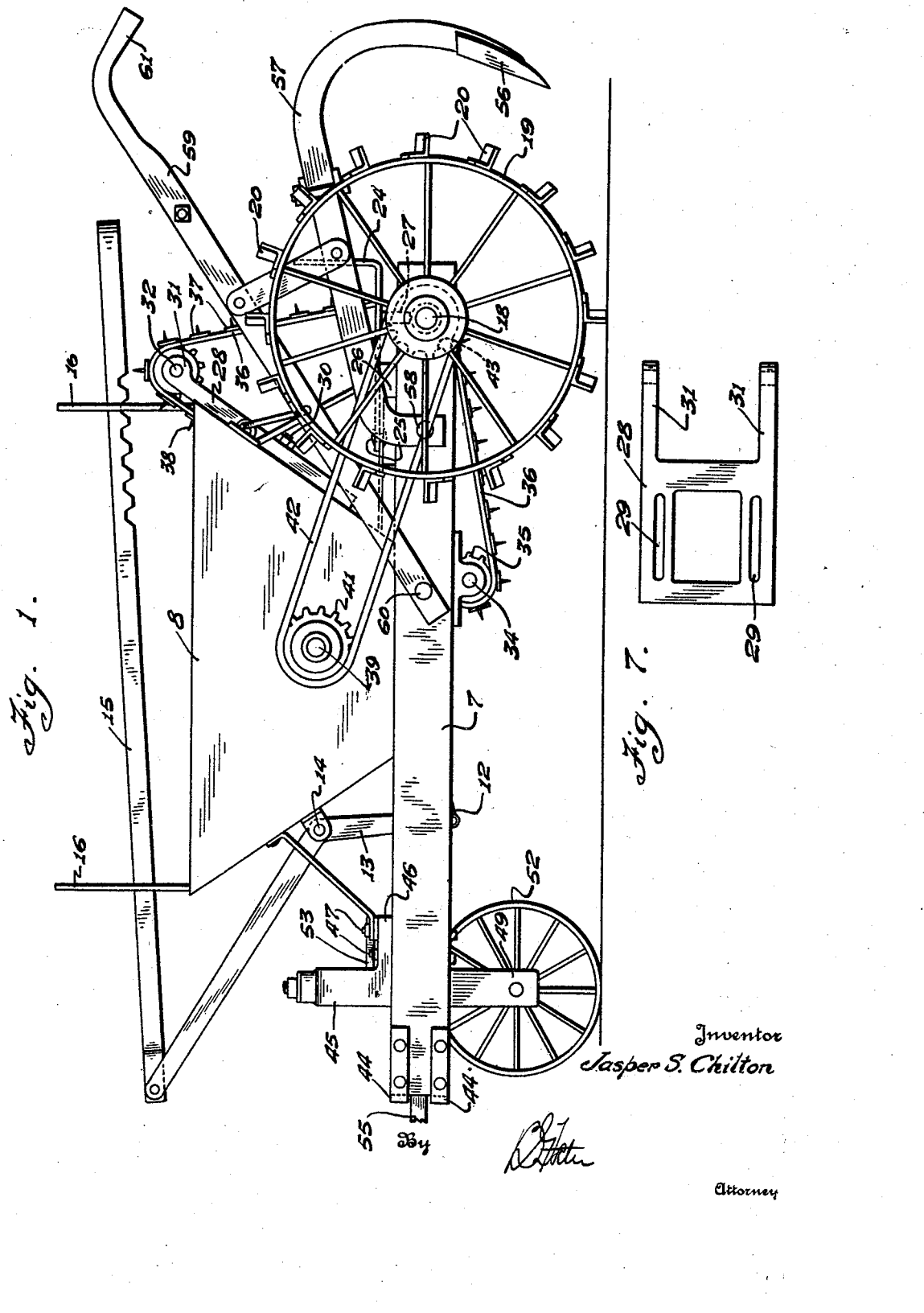
Inventor
Jasper S. Chilton
By
Attorney

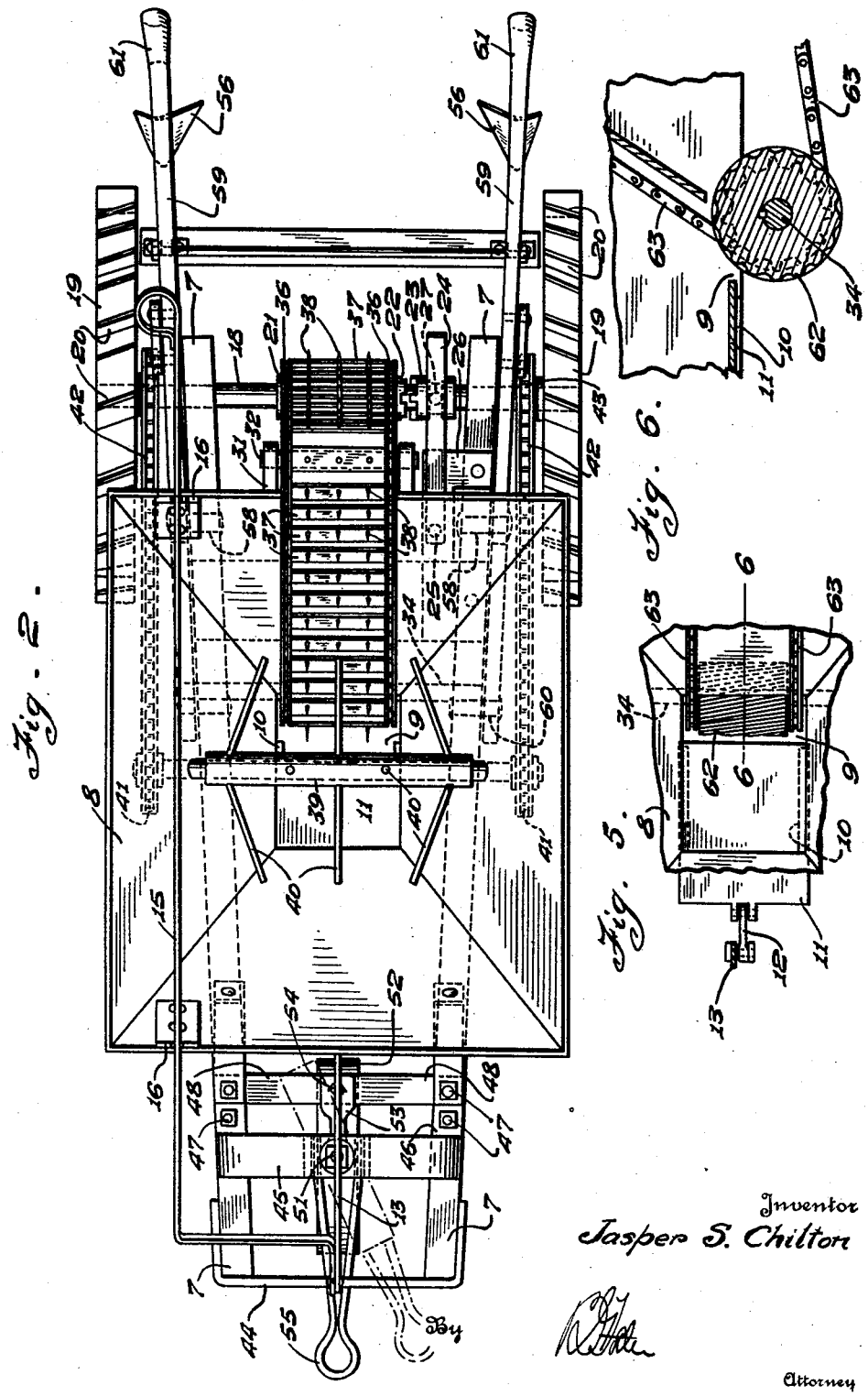

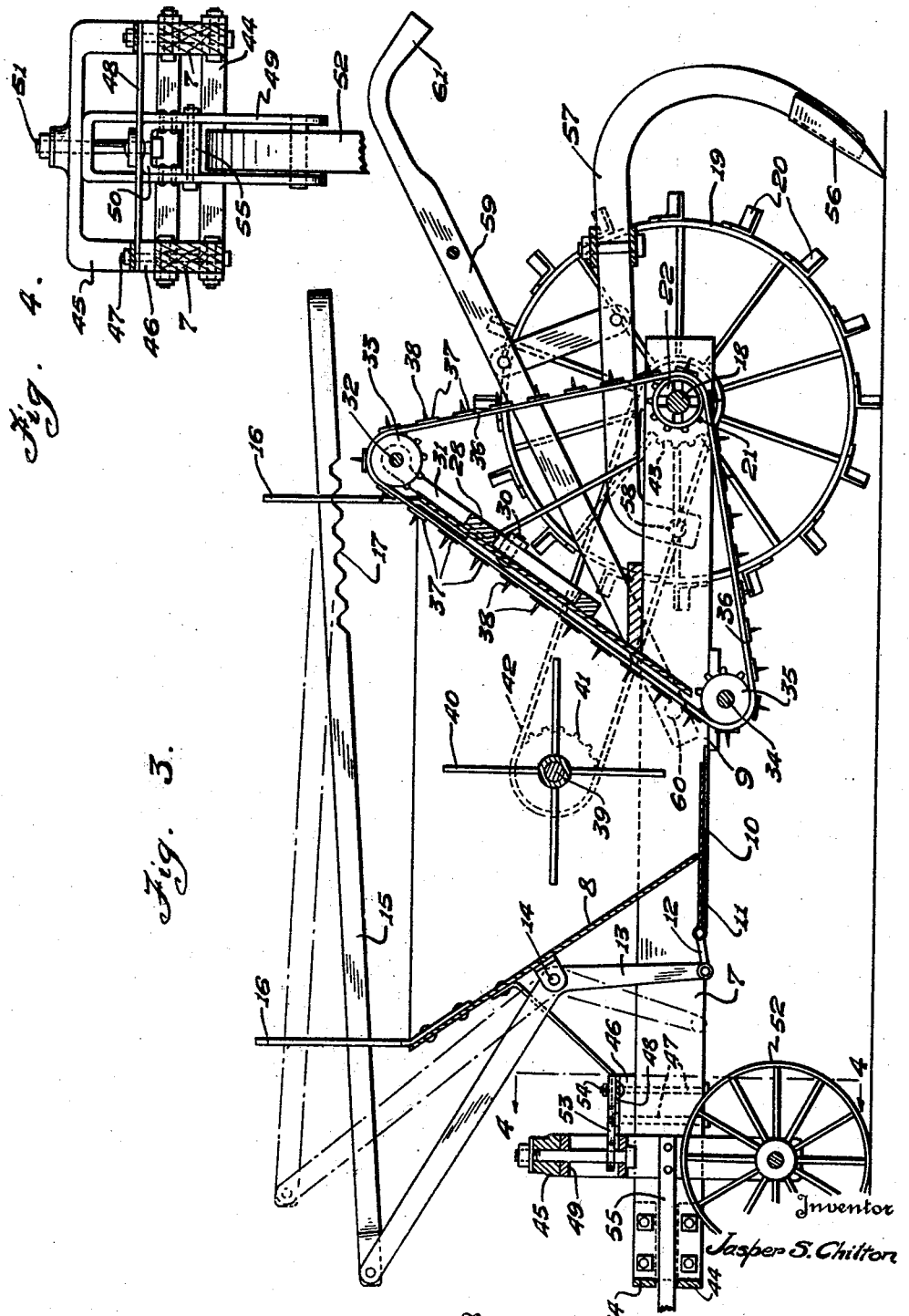

Patented Jan. 13, 1931

1,788,984

UNITED STATES PATENT OFFICE

JASPER S. CHILTON, OF ARARAT, NORTH CAROLINA

FERTILIZER DISTRIBUTOR

Application filed March 26, 1928. Serial No. 264,585.

This invention relates to means for delivering fertilizer as said means progresses over a field, and is in the nature of an improvement on the structure disclosed in and covered by my prior Letters Patent, No. 1,585,020, dated May 18, 1926.

The object is to provide a structure that can be more readily guided in its progress and to employ shovels that can be controlled by the guiding means.

In the accompanying drawings:

Figure 1 is a side elevation of the preferred embodiment of the invention.

Figure 2 is a top plan view of the same.

Figure 3 is a longitudinal sectional view.

Figure 4 is a cross sectional view on the line 4—4 of Figure 3.

Figure 5 is a detail plan view of a slightly modified form of construction.

Figure 6 is a sectional view on the line 6—6 of Figure 5.

Figure 7 is a detail view of the support for the upper sprocket wheels.

In the embodiment disclosed, a supporting frame is provided, which includes spaced longitudinally disposed frame bars 7, and mounted centrally on and extending between said frame bars is a container or hopper 8 for the fertilizer. This hopper has an open bottom 9 and is provided at opposite sides of said open bottom with a guideway 10 in which an adjustable plate or bottom wall 11 is slidably mounted, this bottom wall being connected by a link 12 with the lower arm 13 of a lever fulcrumed at 14 on the front side of the hopper. The upper arm of the lever is pivotally connected to an actuating bar 15 that extends between guides 16 on the upper end of the hopper. The rear end of this bar constitutes a conveying handle and said bar is provided with notches 17 adapted to interfit with the rear guide 16 to hold the bar, and consequently the bottom plate 11 in different adjusted positions.

Journaled on the rear ends of the frame bars 7 is a driving shaft or axle 18, on the ends of which are supporting wheels 19 that are preferably provided with cleats or lugs 20 to prevent their slipping. As the machine progresses and the wheels rotate, they drive the shaft or axle 18. On said shaft or axle is loosely mounted a double sprocket wheel member 21 having at one end a clutch member 22. A coacting clutch member 23, keyed or feathered to rotate with the shaft 18, is movable into and out of coaction with the clutch member 22. To obtain this, a lever 24 is pivoted as shown at 25 on a bracket 26 secured to one of the side bars and this lever has a suitable engagement 27 with the clutch member 23. By swinging the lever obviously the clutch member 23 can be moved into or out of engagement with the sprocket member 21 to clutch the latter to the shaft 18 or release it therefrom.

The hopper has supported on the upper end of its rear walls a plate 28, shown in detail in Figure 7. This plate is provided with slots 29 through which holding bolts 30 are adapted to pass and the plate terminates in upwardly extending ears 31 in which are journaled a shaft 32 carrying sprocket wheels 33. Another shaft 34 is journaled on the side bars 7 beneath the rear end of the hopper and carries sprocket wheels 35. Spaced endless sprocket chains 36 pass around the sprocket wheels of the driving member 21, the upper sprocket wheels 33 and the lower sprocket wheels 35. These sprocket wheels are connected by cross bars 37 having teeth 38 thereon.

Obviously when the distributor moves forwardly and the member 21 is clutched to the shaft 18, the endless belts will be rotated, thereby carrying the stretch that extends downwardly in the rear portion of the hopper just in advance of the rear wall, in a downward direction, and this will cause the movement of the fertilizer (for instance manure) downwardly through the bottom opening. The size of this opening is of course regulated by the position of the plate 11.

Located in the hopper 8 is an agitator comprising a rotary shaft 39 provided with suitable outstanding fingers 40. On one end of the shaft is a sprocket wheel 41, around which passes a sprocket chain 42, which passes around another sprocket wheel 43 fixed to the shaft 18. These agitator fingers, it will be observed, move upwardly alongside the downwardly moving stretch of the conveyor belt and thus tend to rake through and break up clumps of material and the like that may be carried downwardly by the teeth 38. The agitator furthermore carries the material from the front portion of the hopper to the delivery belt.

The side frame bars 7 are connected at their front ends by spaced guide bars 44 that extend across the end of the machine. In rear of said guide bars and mounted on the side bars 7 is a transversely disposed arch bar 45 (see Figure 4). This arch bar has terminal base flanges 46 that rest on the bars 7 and are secured thereto by vertical bolts 47. The base flanges 46 are also connected by a cross bar 48. A substantially U-shaped swivel frame 49 has a bearing against the underside of the central portion of the arch bar 45, and is provided with an intermediate bridge piece 50. Passing through said bridge piece, the upper end of the swivel frame 49 and the central portion of the arch bar 45 is a pivot bolt 51 that permits the turning of the swivel frame 49. In the lower end of this swivel frame is journaled a front supporting guide wheel 52. Preferably there is a link 53 connected to the bolt 51 above the bridge piece 50 and also connected to the cross bar 48 by a bolt 54. A draft yoke 55, secured to the swivel frame extends forwardly between the guide bars 44 and constitutes a hitch to which draft animals or tractor can be connected.

At the rear end of the frame is a pair of shovels, said shovels being designated 56. These shovels are carried by the downturned ends of shovel beams 57 that extend along the side bars 7 and have downturned front ends pivoted, as shown at 58, to said side bars 7. Guiding and shovel controlling handles are provided in the form of bars 59 that are pivoted to the side bars 7 in advance of the pivots 58 and as shown at 60. These bars terminate above the shovels 56 in handle grips 61.

With this construction, it will be evident that the operator can readily manipulate the various instrumentalities from the rear end of the machine. The swivel mounting permits the same to be readily turned and the plows can be raised and lowered as desired by raising and lowering the handles which also act as means for directing the distributor.

Under some circumstances where it is desired to deliver commercial fertilizer and the like, the endless belt may be removed and a ribbed roller 62 employed instead of the same, as illustrated in Figures 5 and 6, this roller being mounted on the shaft 34 and being driven by one or more sprocket chains passed around the sprockets of the rear driving member 21, said sprocket chains being indicated at 63.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. In a fertilizer distributor, the combination with a frame comprising spaced side bars, of fertilizer distributing means mounted thereon, rear supporting wheels, spaced guide bars connecting the front ends of the side bars, an arch bar connecting the side bars in rear of the guide bars, a front supporting and guide wheel having a swivel mounting in the arch bar, and a draft device extending between the guide bars and connected to the swivel mounting.

2. In a fertilizer distributor, the combination with a supporting frame including side bars, of fertilizer holding and distributing means mounted thereon, arms pivoted to the rear end portions of the side bars and having covering shovels, guiding handle bars above the arms pivoted at their front ends to the rear portions of the side bars in advance of the arm pivots, and a link between each handle bar and the shovel carrying arm beneath it.

In testimony whereof, I affix my signature.

JASPER S. CHILTON.